United States Patent
Choi et al.

(10) Patent No.: US 6,232,432 B1
(45) Date of Patent: May 15, 2001

(54) PROCESS FOR THE PREPARATION OF POLYCARBONATES

(75) Inventors: Kil-Yeong Choi; Jae Heung Lee; Sung-Goo Lee; Sang Hyun Park, all of Daejeon; Young Chan Ko, Seoul; Il Seok Choi, Kyungki-do; Kwang Soo Yoon, Kyongsangnam-do, all of (KR)

(73) Assignee: Korea Research Institute of Chemical Technology and S-Oil Corporation, Daejeon (KR)

( * ) Notice: Subject to any disclaimer, the term of this patent is extended or adjusted under 35 U.S.C. 154(b) by 0 days.

(21) Appl. No.: 09/605,394

(22) Filed: Jun. 29, 2000

(30) Foreign Application Priority Data

Jun. 29, 1999 (KR) .................................................. 99-25082

(51) Int. Cl.[7] .................................................. C08G 64/00
(52) U.S. Cl. ............................................ 528/196; 528/198
(58) Field of Search ...................................... 528/196, 198

(56) References Cited

U.S. PATENT DOCUMENTS

| | | | | |
|---|---|---|---|---|
| 4,948,871 | * | 8/1990 | Fukuoka et al. | 528/481 |
| 5,204,377 | * | 4/1993 | Fukawa et al. | 521/60 |
| 5,266,659 | * | 11/1993 | Sivaram et al. | 525/463 |
| 5,717,056 | * | 2/1998 | Varadarajan et al. | 528/196 |

* cited by examiner

*Primary Examiner*—Terressa M. Boykin
(74) *Attorney, Agent, or Firm*—McGuireWoods LLP

(57) ABSTRACT

The present invention relates to a process for the preparation of polycarbonates, more specifically to a process for the preparation of polycarbonates by a solid polymerization of prepolymers obtained by the polymerization between aromatic dihydroxides and diarylcarbonates, which comprises:

a) preparing said prepolymer having a viscosity average molecular weight of 4,000–18,000 g/mole;

b) preparing a microporous foam by injecting high-pressure inert gas; and c) preparing polycarbonates by a solid polymerization, which facilitates the removal of phenol, a by-product, and enhances molecular weight of polycarbonates without using any catalyst due to the relatively high polymerization rate.

5 Claims, No Drawings

PROCESS FOR THE PREPARATION OF POLYCARBONATES

BACKGROUND OF THE INVENTION

FIELD OF THE INVENTION

The present invention relates to a process for the preparation of polycarbonates, more specifically to a process for the preparation of polycarbonates through solid-state polymerization of a prepolymer from aromatic dihydroxides and diarylcarbonates, which comprises
  a) preparing a prepolymer having a viscosity average molecular weight from 4,000 to 18,000 g/mole;
  b) preparing microporous prepolymer foams by introducing a high-pressure inert gas; and
  c) preparing polycarbonates by a solid-state polymerization,
which facilitates the removal of phenol, a by-product, and enhances molecular weight of polycarbonates without using any catalyst due to the relatively high polymerization.

Polycarbonates are widely used in the manufacture of transparent sheets, packaging materials, bumpers for automobiles and compact discs due to its superior transparency, impact resistance, mechanical strength and heat resistance.

Polycarbonates are generally prepared by an interfacial polymerization, where polycarbonates are generated by vigorously mixing aqueous bisphenol-A solution substituted with sodium with a phosgene-containing organic solution. However, this method has the drawbacks that the phosgene used as a starting material is a toxic gas and the solvent used in the polymerization is a chlorine-containing organic solvent that can pollute the air. Moreover, the excessive amount of water used in the production of polycarbonates even after the polymerization requires a further purification of said polycarbonates. A melt polymerization method, which prepares polycarbonates by direct polymerization of monomers without using solvent, has been introduced to solve the above problems. However, the melt polymerization method is also disadvantageous in that it requires not only such a reaction condition of high temperature and high vacuum to remove phenol, by-product but special apparatus also to stir high viscose reaction mixture to obtain the high molecular weight polycarbonates.

A solid-state polymerization method was disclosed in U.S. Pat. Nos. 5,266,659 and 5,717,056 as a way to remedy the melt polymerization method, where a melt polymerization is terminated at a state with a low viscosity to generate solid particles and said particles are allowed to undergo a polymerization while maintaining the solid state. However, the solid-state polymerization method, which requires a reaction between solid-state prepolymers with high molecular weight as well as the easy removal of a reaction by-product, does not appear plausible because its low polymerization rate results in a poor productivity. A catalyst can be added to increase the above polymerization rate in the solid-state polymerization; however, the method using a catalyst is not only costly but can also deteriorate the properties of polycarbonates due to the residues of said catalyst in the final polymers. U.S. Pat. Nos. 4,948,871 and 5,204,377 disclosed the processes of preparing polycarbonates without using a catalyst by a solid-state polymerization at a temperature over 200 by preparing prepolymer from bisphenol-A and diphenylcarbonate, crystallizing in solvents such as acetone and toluene and maintaining the prepolymer in a solid-state to facilitate the easier remove of phenol, a reaction by-product. However, this method also has a low rate of the reaction.

As shown above, the conventional preparation methods of polycarbonates have been shown to have a rather slow reaction rate and be not suitable for the easier removal of the by-product, thus necessitating an urgent emergence of a new version of polycarbonate preparation method.

SUMMARY OF THE INVENTION

To solve said problems, the present invention was performed as follows: a) preparing a prepolymer with a specific viscosity average molecular weight by reacting aromatic dihydroxides with diarylcarbonates; b) preparing prepolymer foam by introducing high-pressure inert gas and discharging the prepolymer by means of a solidification; and c) performing a solid-state polymerization.

Accordingly, an object of this invention is to provide a process of preparing polycarbonates through a solid-state polymerization, wherein the removal of phenol, a by-product, is facile and said polymerization progresses rapidly in the absence of a catalyst.

DETAILED DESCRIPTION OF THE INVENTION

The present invention for preparing polycarbonates by crystallizing a prepolymer synthesized from aromatic dihydroxides and diarylcarbonates and performing a solid-state polymerization comprises the following steps:
  a) preparing a prepolymer having a viscosity average molecular weight of 4,000–18,000 g/mole by the melt polymerization of aromatic dihydroxides and diarylcarbonates;
  b) preparing a prepolymer foam having a specific gravity of 0.5–1.15 by introducing high-pressure inert gas, stirring and then draining the prepolymer;
  c) preparing a solid particle with a crystallinity of 10–50% by crushing the prepolymer foam to the average size of 0.1–2 mm and stirring in the solvent; and
  d) preparing polycarbonates by performing a solid-state polymerization of the solid particles at a temperature of 190–240.

The detailed description of the present invention is given hereunder.

The present invention relates to a process for the preparation of polycarbonates by preparing microporous foams and transforming the same to solid particles for a solid-state polymerization, and removing the phenol, a by-product, to enhance the reaction rate in the absence of a catalyst.

The concrete description of the present method of preparing polycarbonates is given hereunder.

The first step is to prepare a prepolymer by polymerizing aromatic dihydroxides expressed in the following formula (1) and diarylcarbonates through a melt polymerization method,

wherein
  a) $Ar_1$ and $Ar_2$ represent the same or different phenyl group or its derivatives; and b) Z represents a single bond or —O—, —CO—, —S—, —SO$_2$—, —SO—, —CON(R$_1$)— or —C(R$_2$R$_3$)— linkage; R$_1$, R$_2$ and R$_3$ repsectively represents H or —(CH$_2$)$_n$CH$_3$; and n is an integer in the range of 0–4.

Polycarbonate prepolymer having a viscosity average molecular weight of 4,000–18,000 g/mole is prepared by reacting 1–1.2 molar equivalents of diarylcarbonates with 1 molar equivalent of the aromatic dihydroxide in the vacuous melt-state. If the molar equivalence of the diarylcarbonates is smaller than 1, or if it exceeds 1.2, it becomes difficult to obtain a high-molecular-weight product.

Especially, if the viscosity average molecular weight of the prepared prepolymer is smaller than 4,000 g/mole, it is difficult to obtain a prepolymer foam; on the other hand, if it exceeds 18,000 g/mole, it becomes difficult to obtain fine particles. Also, the molar ratio of the phenyl and hydroxyl end groups in the prepolymer plays an important role in increasing molecular weight during a solid-state polymerization. The molar ratio of end phenyl/hydroxyl group of the intermediate is preferred to be in the range of 90/10–10/90, and if it is beyond this range, it is difficult to obtain polycarbonates with a high molecular weight.

The second step is to prepare microporous foams having 0.5–1.15 of specific gravity by a) introducing a high-pressure (1–20 atm) inert gas into the prepolymer melt and stirring the same for 1–200 min; and b) releasing the high pressure and ejecting the same with cooling. If the porosity in the foam is excessive, the specific gravity becomes lower than 0.5, and therefore the particle becomes brittle; on the other hand, if the specific gravity exceeds 1.15, the molecular weight does not become high enough during a solid-state polymerization.

The third step is to obtain solid particles having 10–50% of crystallinity by crushing the foam; sieving the same to 0.1–2 mm; and stirring the same in a solvent for 5–120 min; drying the same in an oven. If the particle size is smaller than 0.1 mm, partial fusion tends to occur during a solid-state polymerization; otherwise if the particle size exceeds 2 mm, the polymerization rate becomes very low, thus requiring more time to obtain polycarbonates with high molecular weight. The crystallinity of the particle sustains a solid state during a solid-state polymerization at the temperature lower than crystallization melting temperature (T$_m$): if the crystallinity is lower than 10%, particle fusion occurs during a solid-state polymerization; on the other hand if it exceeds 50%, the rate of solid-state polymerization becomes low. In the present invention, the solvent can be selected from a group consisting of acetone, toluene, xylene and the mixture thereof. The final step is to prepare polycarbonates having 22,000–100,000 g/mole of a viscosity average molecular weight by heating the solid particles up to a polymerization temperature and reacting the same at 190–240 for 1–72 hr.

The following examples are intended to be illustrative of the present invention and should not be construed as limiting the scope of this invention defined by the appended claims.

EXAMPLE 1

2.2 kg of diphenylcarbonate (DPC) and bisphenol-A (BPA) mixed in the ratio of 1:1.05 were placed in a 4 L stainless steel reactor equipped with a stirrer, a thermometer, a nitrogen gas inlet, a condenser, and a vacuum pump. After introducing alternatively both vacuum and a nitrogen gas three times, the temperature was slowly raised at the rate of 1/min to 230 while flowing nitrogen gas at the rate of 2 L/min. Then, the reaction was conducted for 2 hrs at 230 and the pressure was reduced to 200 torr. The reaction was conducted for another hour and the pressure was reduced to 1 torr. The reaction was conducted for another hour, and was followed by filling with a nitrogen gas of 5 atm, stirring for 1 hr at 100 rpm, and exudating the product from the drain located under the reactor and generated prepolymer foam. After measuring the molecular weight and specific gravity of the product, the same was crushed with a crusher, and the particles that passed through a sieve of 0.72 mm were collected. The collected particles were then slowly added into a 5 L flask filled with acetone for 1 hr while vigorously stirring at 800 rpm. The resulting particles were dried under the vacuum and 400 g of said dried particles were placed into a 2 L resin kettle. The resin kettle at room temperature was gradually heated in an oil bath to reach 180 for 1 hr, slowly heated to reach 220 for 4 hr and was allowed to react under vacuum of less than 1 torr of pressure to produce polycarbonates.

Comparative Example 1

Comparative Example 1 was performed as in the Example 1, with the exception that the nitrogen gas was not filled in and that the prepolymer foam was not generated.

EXAMPLES 2–3
and

Comparative Example 2

In Examples 2–3 and Comparative Example 2, the pressure and filling time of compressed nitrogen gas was varied to generate prepolymer foams with different specific gravities.

EXAMPLES 4–5
and

Comparative Examples 3–4

Prepolymers with different molecular weights were obtained by varying the reaction time of polymerization.

EXAMPLES 6–7
and

Comparative Examples 5–6

In Examples 6–7 and Comparative Examples 5–6, the molar ratio of diphenylcarbonate and bisphenol-A in Example 1 was modified as shown in Table 1 to change the ratio between the phenyl group and the hydroxy group of the prepolymer end groups.

EXAMPLE 8–10

Experiments were performed as in the Example 1 with the exception that the final reaction temperature and time in solid-state polymerization step were both increased to 230 and 72 hr, respectively, to increase the viscosity average molecular weight.

Comparative Examples 7–8

Experiments were performed as in the Example 1 with the exception that crushing time was adjusted to obtain particles with different sizes as shown in Table 1.

Table 1 shows the results of thus obtained prepolymers in terms of the molecular weight, the ratio of the end group, the particle size, the crystallinity, as well as the molecular weight of the resulting solid-polymerized polycarbonates. The contents of the end groups were obtained by means of $^1$H-NMR, and the crystallinity was calculated with reference to a reported value of 134 J/g (heat of fusion for 100%-crystalline polycarbonate) using a DSC, after measuring heat of fusion from the DSC curves. The viscosity average molecular weights ($M_v$) of polycarbonate prepolymers and polycarbonates were calculated by the following Equation 1, based on the intrinsic viscosity ([η]) measured at 25 using a chloroform as a solvent.

$$[\eta] = K M_v^a \quad \text{Equation 1}$$

wherein, K=0.012 cm$^3$/g; and a=0.82.

What is claimed is:

1. A process for the preparation of polycarbonates which comprises:
   (a) preparing a prepolymer having a viscosity average molecular weight of 4,000–18,000 g/mole through melt polymerization of aromatic dihydroxide and diarylcarbonate, wherein the viscosity average molecular weight is determined from intrinsic viscosity measurements at 25° C. using dilute polycarbonate chloroform solutions;
   (b) preparing a microporous foam having a specific gravity of 0.4–1.15 by introducing high-pressure inert gas, stirring, and discharging said prepolymer;
   (c) preparing a solid particle having 10–50% of crystallinity by crushing said prepolymer foam to a mean particle size of 0.1–2 mm and stirring in the solvent; and
   (d) preparing polycarbonates by a solid-state polymerization of the solid particle at 190–240° C.

TABLE 1

|  | DPC/B PA (molar ratio) | Prepolymer $M_v^{a)}$ (g/mole) | Molar ratio$^{b)}$ (—Ph/—OH) | Specific gravity (g/cm$^3$) | Particle size (mm) | Crystallinity (%) | PC $M_v$ (g/mole) |
|---|---|---|---|---|---|---|---|
| Example |  |  |  |  |  |  |  |
| 1 | 1.05 | 10,800 | 70/30 | 0.87 | 0.72 | 20 | 35,000 |
| 2 | 1.05 | 11,100 | 71/29 | 1.10 | 0.72 | 25 | 27,500 |
| 3 | 1.05 | 10,500 | 65/35 | 0.59 | 0.72 | 21 | 41,500 |
| 4 | 1.05 | 15,500 | 68/32 | 0.72 | 0.72 | 30 | 34,200 |
| 5 | 1.05 | 4,800 | 72/28 | 0.95 | 0.72 | 18 | 28,500 |
| 6 | 1.11 | 9,500 | 89/11 | 0.85 | 0.72 | 18 | 24,000 |
| 7 | 1.00 | 10,000 | 30/70 | 0.83 | 0.72 | 21 | 25,300 |
| 8 | 1.05 | 10,800 | 70/30 | 0.84 | 0.25 | 32 | 38,200 |
| 9 | 1.05 | 10,800 | 70/30 | 0.90 | 1.5 | 10 | 22,500 |
| 10 | 1.05 | 10,900 | 69/31 | 0.86 | 0.72 | 22 | 88,500 |
| Comparative Example |  |  |  |  |  |  |  |
| 1 | 1.05 | 10,800 | 69/31 | 1.20 | 0.72 | 21 | 20,500 |
| 2 | 1.05 | 10,800 | 68/32 | 0.50 | c) | 27 | 28,200 |
| 3 | 1.05 | 3,500 | 60/40 | 1.19 | 0.72 | 13 | 19,000 |
| 4 | 1.05 | 20,500 | 68/32 | 0.80 | c) | — | — |
| 5 | 1.16 | 8,000 | 95/5 | 0.90 | 0.72 | 18 | 19,000 |
| 6 | 0.90 | 8,500 | 2/98 | 0.88 | 0.72 | 23 | 17,800 |
| 7 | 1.05 | 10,800 | 70/30 | 0.87 | 2.1 | 15 | 15,500 |
| 8 | 1.05 | 10,800 | 70/30 | 0.87 | 0.1 | 23 | 21,000 |

$^{a)}$a viscosity average molecular weight ($M_v$)
$^{b)}$molar ratio of the end group in prepolymers (—Ph/—OH)
$^{c)}$difficult to crush As shown in Table 1, if the prepolymers are not having good porosities or have high specific gravitites, molecular weight tends to be low; and if the molecular weight of the prepolymer exceeds 20,000 g/mole, crushing becomes difficult. If the molar ratio between the phenyl group and the hydroxy group of the prepolymer end groups is out of the range of 90/10–10/90, the molecular weight does not increase sufficiently; and if the particle size exceeds 2 mm, the molecular weight after solid-state polymerization becomes low.

As explained in detail above, the present invention provides a simplified and cost-effective method to prepare polycarbonates with a high molecular weight by using a porous prepolymer in the solid-state polymerization, which not only facilitates the easier removal of phenol, a by-product, but also requires no catalyst.

2. A process for the preparation of polycarbonates according to claim 1, wherein the molar ratio between the end phenyl group and the end hydroxy group of said prepolymer in the above step a) is 10/90–90/10.

3. A process for the preparation of polycarbonates according to claim 1, wherein the high-pressure inert gas used in said step b) is a nitrogen gas.

4. A process for the preparation of polycarbonates according to claim 1, wherein the solvent used in said step c) is selected from the group consisting of acetone, toluene and xylene.

5. A process for the preparation of polycarbonates according to claim 1, wherein the viscosity average molecular weight of polycarbonate prepared in said step d) falls in the range of 22,000–100,000 g/mole.

* * * * *